United States Patent [19]

Blinow

[11] 3,959,805
[45] May 25, 1976

[54] ADJUSTABLE DUAL ACTION SWITCH
[75] Inventor: Igor Blinow, Millis, Mass.
[73] Assignee: Polaroid Corporation, Cambridge, Mass.
[22] Filed: Aug. 2, 1974
[21] Appl. No.: 494,198

[52] U.S. Cl................... 354/202; 200/153 LB; 354/173
[51] Int. Cl.² .......................... G03B 17/00
[58] Field of Search................ 354/173, 137, 202; 200/153 LB

[56] References Cited
UNITED STATES PATENTS

| | | | |
|---|---|---|---|
| 2,218,494 | 10/1940 | Steiner | 354/137 |
| 3,119,315 | 1/1964 | Lange | 354/173 |
| 3,656,420 | 4/1972 | Aizawa | 354/173 |

*Primary Examiner*—John Gonzales
*Attorney, Agent, or Firm*—William A. Danchuk; Alfred E. Corrigan

[57] ABSTRACT

An electrical switching arrangement is provided for use with a photographic camera having a plurality of electrically responsive operational functions necessary for its proper operation. The switching arrangement includes an actuator member which sequentially actuates two switches, supported by a supporting member, formed as a part of the switching arrangement, in precise timed relationship to each other for automatically providing operational functions to the camera. The arrangement includes mechanisms which provide for precision adjustment of the two switches relative to the actuator member such that proper sequencing and precise actuation occurs at both switches.

11 Claims, 6 Drawing Figures

ADJUSTABLE DUAL ACTION SWITCH

BACKGROUND OF THE INVENTION

1. Field of the Invention

This invention relates to an electrical switching arrangement and, more particularly, to a switching arrangement formed as an integral portion of appropriate electrical circuitry in a photographic camera.

2. Description of the Prior Art

There exists in the electrical field a multitude of different types of electrical switches which operate in a variety of ways for performing or permitting a variety of functions. These switches may range from the very simple to the rather complex, from the simple single throw knife switch to the complex family of electromagnetic switches. While there exists a large variety of electrical switches, they are configured having opened and closed positions and are placed in one or the other of the positions in response to a single given impetus or input. Exemplary of such given inputs are those involving actuation of switching elements in response to pushing or pulling forces, electronic pulses, and spring forces which are stored and then subsequently released.

The single switch-single input type switches are susceptible of an infinite number of practical applications in the electrical field and serve these applications very well. Additionally, there exist many applications which necessitate the use of two of such switches in parallel or in series to provide for a plurality functions dependent upon specific switching conditions as a prerequisite for proper operation. One such application is in the photographic camera industry, and more particularly, to exposure control circuits incorporated within such cameras which require precise sequencing of switching operations mechanically performed on a number of different electrical switches.

While a plurality of independent single input switches may be utilized within a camera system, it is desirable in a mass production environment that pieces and parts be kept to a minimum for maximized production efficiency. Moreover, space limitations as well as the importance of precise mechanical sequencing of switching operations may dictate the employment of a switching arrangement including a minimization of piece numbers while retaining the availability of precise adjustments to the individual components of the switching arrangement.

SUMMARY OF THE INVENTION

The present invention is addressed to an improved electric switching arrangement preferably for an exposure control and actuation circuit as provided in conjunction with a photographic camera having a plurality of operational programs which require precise sequencing and functioning.

The switching arrangement, although susceptible of utilization in various other areas, is employed in conjunction with a camera characterized in having a reflex-type mirror which is movable between a viewing position and an exposure position within a housing which includes an exposure chamber. A plurality of movable elements are both directly and indirectly moved for initiating mirror movement as well as a result of mirror movement. The switching arrangement of the present invention is responsive to movement of an actuating member which is formed on one of the above-mentioned movable elements. Movement of the actuating member sequentially actuates two switches formed as a part of the switching arrangement in specific timed relationship to each other for automatically providing operational functions to the exposure control and actuation circuitry within the camera.

The switching arrangement provides for precision adjustment of both of the two switches relative to the actuator member such that proper sequencing and precise actuation may occur at both switches. It is in this regard that a first adjustment is provided for one of the switches relative to the actuator member and a second adjustment is provided for the other relative to the actuator member. At least one, if not both, of the adjustments includes an eccentric drive adjusting member for precisely adjusting the switch with which it is associated relative to the actuator member for insuring the proper sequential actuation of the switches.

The switching arrangement is incorporated within a mass production environment in which modular components are utilized for both cost reduction as well as production efficiency. Consequently, the switching arrangement must provide for the above-noted precision adjustments within a modular unit spacially minimized which requires its adjustment in a dynamic state.

Accordingly, one feature and object of the present invention is to provide an electric switching arrangement for providing for a plurality of switching functions in response to a movable actuator member, the switching arrangement including a plurality of adjusting elements for precisely controlling the sequencing of switching functions performed by the switching arrangement.

Another feature and object of the present invention is to provide an electric switching arrangment including first and second electric switches, mechanically activated for performing a plurality of switching functions, the switching arrangement including an adjustable actuator member which is adjustable relative to one of the electric switches and an adjusting member for adjusting the other of the electric switches relative to the actuator member.

Still another feature and object of the present invention is to provide an electrical switching arrangement including at least two switches and adjusting means for adjusting each of the switches relative to a common actuator, the adjusting means including an eccentric drive adjusting member associated with at least one of the switches, such that each of the switches may be independently adjusted relative to the actuator.

Other objects and features of the present invention will in part appear hereinafter and will in part become obvious as the present application progresses.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in conjunction with the accompanying drawings wherein.

DETAILED DESCRIPTION OF THE INVENTION

Figure 1:
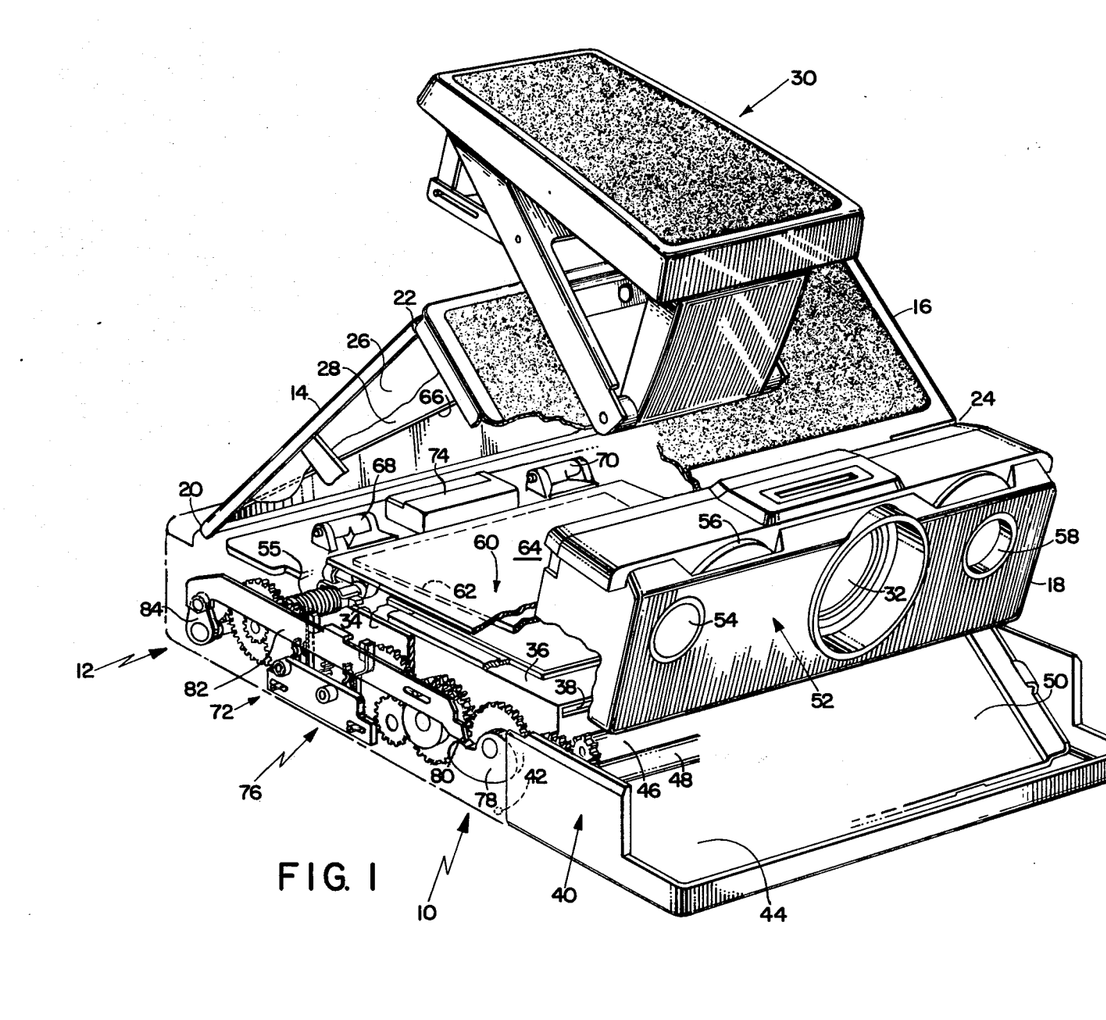
FIG. 1 is a pictorial representation of a single-lens reflex camera according to and including the present invention shown in its erected configuration with portions broken away to reveal internal structure.

Referring to FIG. 1, a fully automatic reflex camera incorporating the features of the instant invention is portrayed generally at 10. Camera 10 is shown in an erected configuration suited for exposing a photosensitive film unit contained therein. Camera 10 includes a bottom housing section 12, a rear housing section 14, a top housing section 16 and a front exposure control housing 18, all pivotally associated with base 12 so as to be foldable. When so folded from the erected configuration shown, camera 10 assumes a thin and compact shape suiting it to be conveniently carried. The specific hinge connections providing for the jointed structure, while not being visible in the figure, are positioned at axes 20, 22, 24 and at the lower rear portion of exposure housing 18. When erected, sections 12, 14, 16 and 18 cooperate to define four supporting sides of a six-sided exposure chamber 28. An opaque flexible bellows 26 is located within the confines of sections 12, 14, 16 and 18 for providing a light-tight arrangement for the exposure chamber 28.

Positioned upon top housing section 16 is a viewfinder apparatus shown generally at 30. Viewfinder 30 and its related internal components are described in detail in U.S. Pat. No. 3,783,764 by James G. Baker. Viewfinder 30 is constructed having mutually movable components which permit its erection (See FIG. 1) and its collapse.

When camera 10 is erected, exposure control housing 18 is withdrawn from its nested orientation within the forwardmost portion of base 12 and is moved so as to position an optical taking lens assembly 32 for making an exposure.

Base 12 includes an inner frame assembly, a portion of which is shown at 34. Inner frame assembly 34, as well as the outer portions of base 12, cooperate to provide structural support for numerous instrumentalities of the camera. For instance, frame 34 is configured to define a receiving chamber for retaining and securing a disposable film retaining cassette structure, a portion of which is shwon at 36. Cassette structure 36 is of a rectangular configuration and retains a plurality of stacked film units, the uppermost one of which is positioned in coincidence with the exposure plane of camera 10. Formed on the forwardmost peripheral side of cassette 36 is an egress opening or slot 38 through which the uppermost film unit is removed for processing following its exposure.

The cassette 36 is inserted into the receiving chamber formed within base 12 through a "film door" 40 formed as a result of a pivotal connection as at 42 between base 12 and the forwardmost housing portion 44 formed as an "extension" of base 12 when the former is closed, as shown in FIG. 1.

Described in detail in a U.S. Patent by Edwin H. Land, U.S. Pat. No. 3,415,644, entitled "Novel Photographic Products and Processes", the film units contained within cassette 36 include all the materials necessary to produce positive photographic prints. The photosensitive composite is located in a position such that it may be easily withdrawn through the exit slot 38 and has a rupturable container of processing fluid (not shown) secured thereto. Upon exiting through slot 38, the uppermost film unit is engaged by a pair of pressure-applying rollers 46 and 48. Rollers 46 and 48 are supported for rotation by a supporting structure (not shown) secured to housing portion 44. Upon engaging the film unit, rollers 46 and 48 rupture the container of processing fluid and dispense the fluid along the photosensitive composite.

Pivotally connected to the forwardmost portion 44 of base 12 is a light baffle member 50. A spring (not shown) is connected between baffle member 50 and its pivot for automatically erecting member 50 when camera 10 is in an erected configuration. This status is best shown in FIG. 1. When erected, baffle member 50 provides a light shield or shade for the exiting film unit. The exiting film unit passes through an exit slot (not shown) provided in a bottom wall of the forwardmost housing section 44. Due to the specific configuration of the film unit, shading is necessary in order to prevent actinic light from "piping" through the film unit and clouding that portion of the film unit which has not yet passed through the rollers 46 and 48. For a fuller understanding of the nature and operation of baffle member 50, reference should be made to U.S. Pat. No. 3,810,211 entitled "Self-Developing Camera System" by Richard R. Wareham and Richard Paglia.

Exposure control housing 18, positioned at the front of camera 10, contains all the necessary components for controlling the exposure of photosensitive material contained within the cassette 36. These components generally include a shutter assembly 52, an exposure initiating button 54, a focusing wheel 56, and a photosensing system and trim mechanism 58 for automatically determining the correct exposure for a given scene to be photographed.

Camera 10 operates in a reflex fashion, the camera being convertible between viewing and exposure operational modes by a reflex assembly, including a planar reflex reflecting component or mirror 60. Mirror 60, shown at an intermediate position evidenced during a transition from one of its positions to the other, is configured having a mirror surface 62, mounted upon its underside and a viewing surface 64, positioned upon or forming its upward surface. In the course of a photographic cycle, reflex component 60 is moved from a viewing position, in which it overlies film cassette 36 and in which it serves to secure the individual film units from being permaturely exposed, to an exposure position abutting against a second mirror 66 located upon the underside of rear wall 14. Movement between the viewing and exposure positions is pivotal, the mirror 60 being coupled to inner frame 34 at hinges 68 and 70.

When mirror 60 is in an overlying relationship to cassette 36, to secure the exposure plane of the camera 10, a viewing mode optical path is established. This path extends from the taking lens 32 to the reflecting surface of mirror 66 at the rear of the camera and thence to viewing surface 64 on the upward side of mirror 60 then back to mirror 66 and finally through viewfinder 30 to the operator's eye.

The exposure mode optical path orientation of camera 10 is established by pivoting reflex component 60 to a position in which it is substantially against the inner surface of rear wall 14. In this orientation, the optical path now extends from the taking lens 32 to mirror 62, positioned on the underside of reflex component 60 and then to the uppermost one of the film or photographic units positioned within the cassette 36 at the exposure plane of camera 10.

Supporting a number of operational features of camera 10 is a drive control system 72. Described in detail and claimed in a U.S. Pat. No. 3,714,879 by Edwin H. Land, Igor Blinow and V. K. Eloranta, entitled "Reflex Camera", and assigned in common herewith, the drive control system utilizes the output of a motor 74 to selectively drive an elongated thin gear train, certain components of which are shown generally at 76, extending along one lateral side of camera 10. The various geared components of gear train 76 are rotatably mounted upon camera 10 between inner frame 34 and an outer plate 106 (See FIG. 5). Included within gear train 76 is a phase control cam 78 which is rotatably driven counterclockwise through one revolution during the course of a single photographic cycle of the camera 10. Cam 78 operates in conjunction with an elongated end 80 of a ram 82. Ram 82 is slidably mounted adjacent gear train 76 between the outer face thereof and the outer plate 106 and is driveably connected to an input crank 84 mounted, in turn, at the rear of camera 10. Input crank 84 is connected by a drive spring linkage as at 55 to the reflex component or mirror 60 at hinge 68.

The position of mirror 60 throughout any given photographic cycle is controlled by select energization of motor 74 and consequent rotation of the phase control cam 78 through the appropriate gears contained within gear train 76. For instance, when camera 10 is in a viewing mode orientation, elongated end 80 of ram 82 serves to retain the mirror 60 in its exposure plane position in overlying relationship with the uppermost film unit contained within film cassette 36. When the mirror 60 is so retained, cam 78 is in a radial orientation wherein it holds elongated end 80 and the associated ram 82 at a terminal rearward position against the bias asserted by the spring linkages 55 noted above which are utilized to drive the mirror 60 and which are exerted through the input crank 84. A controlled energization of motor 74 early in a given photographic cycle causes the gear train 76 to rotate such that cam 78 is rotated counterclockwise to a position where the elongated end 80 of ram 82 releases from contact with the cam 78, permitting ram 82 to be driven in correspondence with mirror 60 by the noted drive springs into their respective terminal positions. The pre-released condition of ram 82 may be best seen by referring to FIG. 2, the terminal position of ram 82 may be best seen by referring to FIG. 4, while an intermediate point in its movement may be best seen in FIG. 3.

Figure 5:
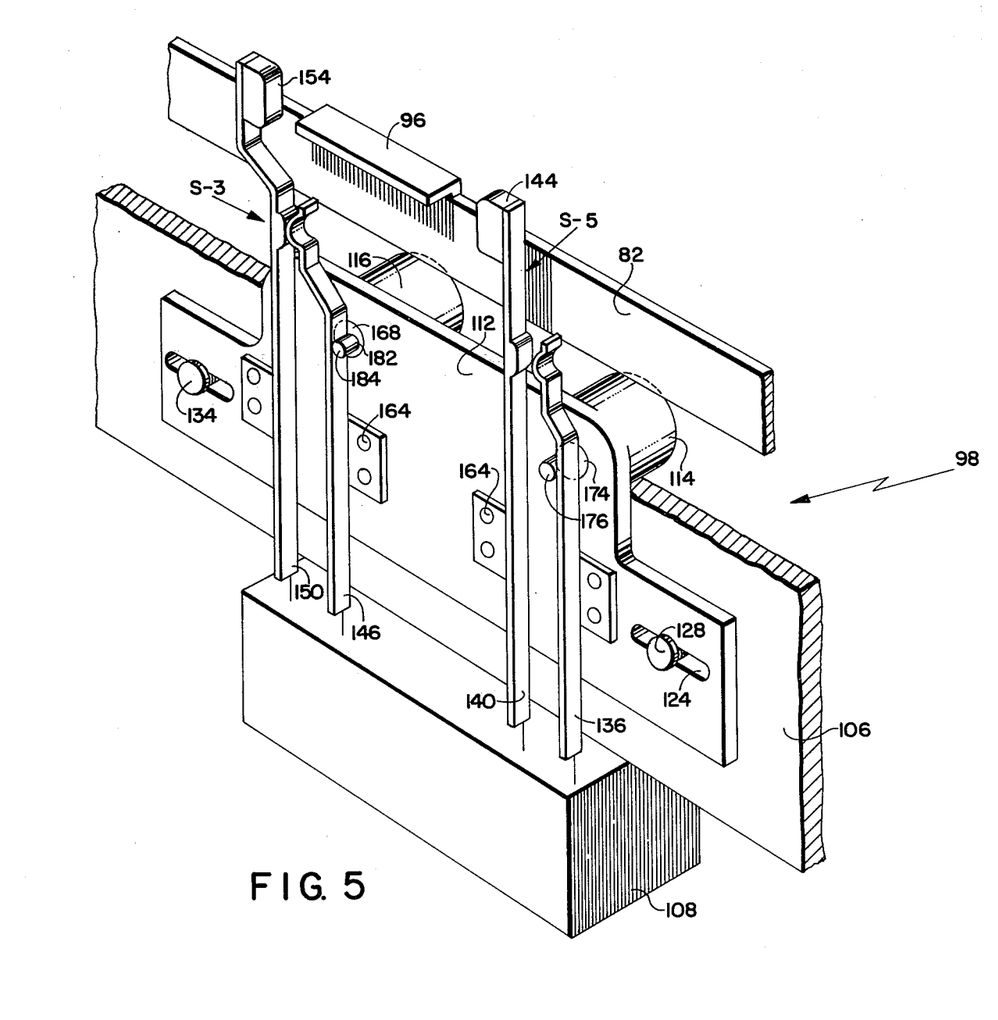
FIG. 5 is a perspective view of the switching arrangement of FIG. 2 with certain portions broken away to show internal detail.

As noted previously, ram 82 is slidably mounted between the outer face of gear train 76 and the outer plate 106 (See FIG. 5). Ram 82 is in part supported by a pin and slot arrangement 86 including a slot 88 formed within a forward portion of ram 82 and a pin 90 formed on the outer plate and extending inwardly so as to be captured within slot 88 of ram 82. Ram 82 is connected to input crank 84 through a pivot pin 92, while the input crank 84 is connected to the spring linkages 55 through a drive shaft 94. An actuator member 96 is formed on a top portion of ram 82 and is located proximate the center thereof. Actuator member 96 is an inwardly extending member for selective functional actuation of a switching arrangement shown generally at 98.

Switching arrangement 98 includes a first switch 100, hereafter referred to as switch 5 or S5 and a second switch 102, hereafter referred to as switch 3 or S3. A support member 104, formed from a non-conductive material, is employed to support both switches S5 and S3 in a specifically spaced relationship from each other as will be discussed in further detail below. Support member 104 is secured to the other plate of camera 10, a portion of which is shown at 106. Both switches S5 and S3 are connected to specific portions of the camera's exposure control circuitry generally denoted at 108. The functions which S5 and S3 perform relative to the exposure control circuitry will be discussed further below.

Support member 104 includes a base 110 having an extension 112 formed as an integral part thereof. Extension 112 supports a pair of outwardly extending cylindrically shaped bosses 114 and 116 associated with S5 and S3, respectively. Support member 104 is supported for lateral movement in the directions indicated by arrow 118 by two pin and slot arrangements 120 and 122. Pin and slot arrangement 120 includes a slot 124 formed in a portion of base 110 and a pin 126 extending inwardly from the outer plate 106 and having an inner end 128 (See FIG. 5) which prevents the lateral movement of the switching arrangement 98 relative to the outer plate 106. Similarly, the pin and slot arrangement 122 is formed having a slot 130 through which extends a pin 132 having an inner flattened end 134 which acts in much the same way as end 128 of pin 126. Both the pin and slot arrangements 120 and 122 provide for the longitudinal movement of the switching arrangement 98 relative to the outer plate 106, to the ram 82 (when the ram is in a stationery position) and most importantly, to the actuator member 96.

The two switches S5 and S3 which are formed as a part of the switching arrangement 98 are selectively actuated and deactuated by the actuator member 96 formed on the upper portion of ram 82. Switch S5 generally includes a first contact 136 having an electrical contact point 138 at its uppermost portion, and a second contact element 140 having an associated electrical contact point 142 and terminating at its uppermost end in an electrically non-conductive pad 144. Switch S3 includes a first contact element 146 having an associated electrical contact point 148 at its uppermost portion, and a second contact element 150 having an associated electrical contact point 152 and terminating in an electrically non-conductive pad 154 located at its uppermost point. First contact element 136 and second contact element 140 of switch S5 are partially secured to the base 110 of support member 104 by two staked over portions 156 and 158, respectively. Similarly, first contact element 146 and second contact element 150 of switch S3 are secured to the base 110 of support member 104 by two staked over portions 160 and 162, respectively. The staked over portions 156, 158, 160 and 162 are secured to the base 110 by rivets or the like such as that shown at 164.

The two bosses 114 and 116 of the extension 112 are formed having hollow cores 166 and 168, respectively.

Disposed within core 166 is an eccentric drive arrangement 170. Eccentric drive arrangement 170 is configured to be threadably mounted within the hollow core 166 of boss 114 by screw threads (not shown). A screw driver slot 172 is provided at the outwardly directed end of the eccentric drive arrangement such that the arrangement may be conveniently turned within hollow core 166. The opposite end 174 of the eccentric drive arrangement 170 (as may be best seen in FIG. 5) is formed having an off center extension 176 which is configured to extend fully through the hollow core 166 and past the inner surface of extension 112. Extension 176 provides an eccentrically driven element relative to the center of the hollow core 166 when the eccentric drive arrangement 170 is rotated within the hollow core 166 through the use of the screw driver slot 172. Similarly, the boss 116 has an eccentric drive arrangement 178 associated with it. The eccentric drive arrangement 178 is configured having a screw driver-like slot 180 which provides for convenient rotation of the eccentric drive arrangement 178 in a threaded fashion within the hollow core 168. The opposite end 182 of the eccentric drive arrangement 178 is formed having an off centered extension 184, similar to the extension 176 of the eccentric drive arrangement 170.

Figure 2:
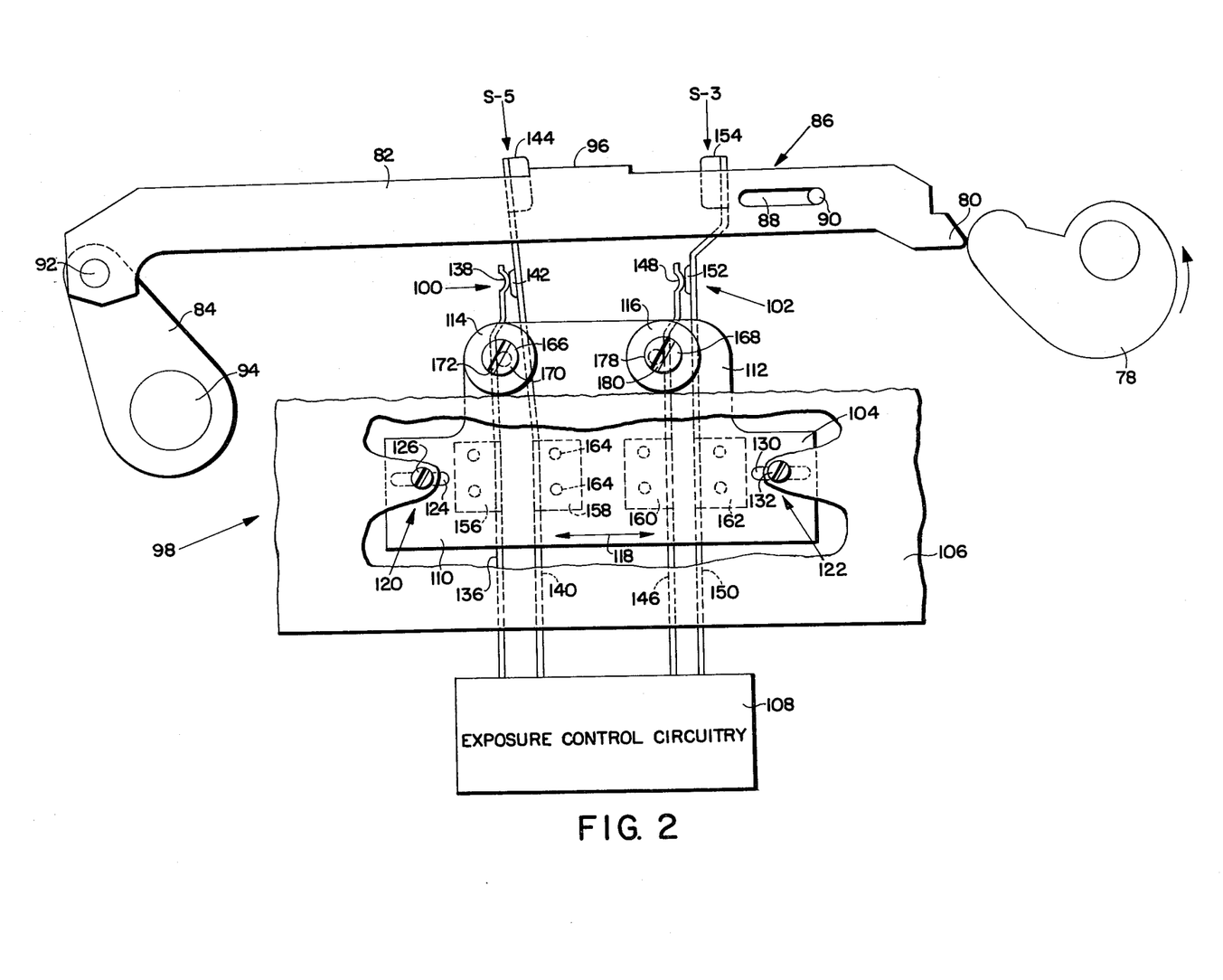
FIG. 2 is an enlarged side elevational view, with portions broken away, of a portion of the camera shown in FIG. 1 showing the switching arrangement of the present invention in one operational mode.
Figure 3:
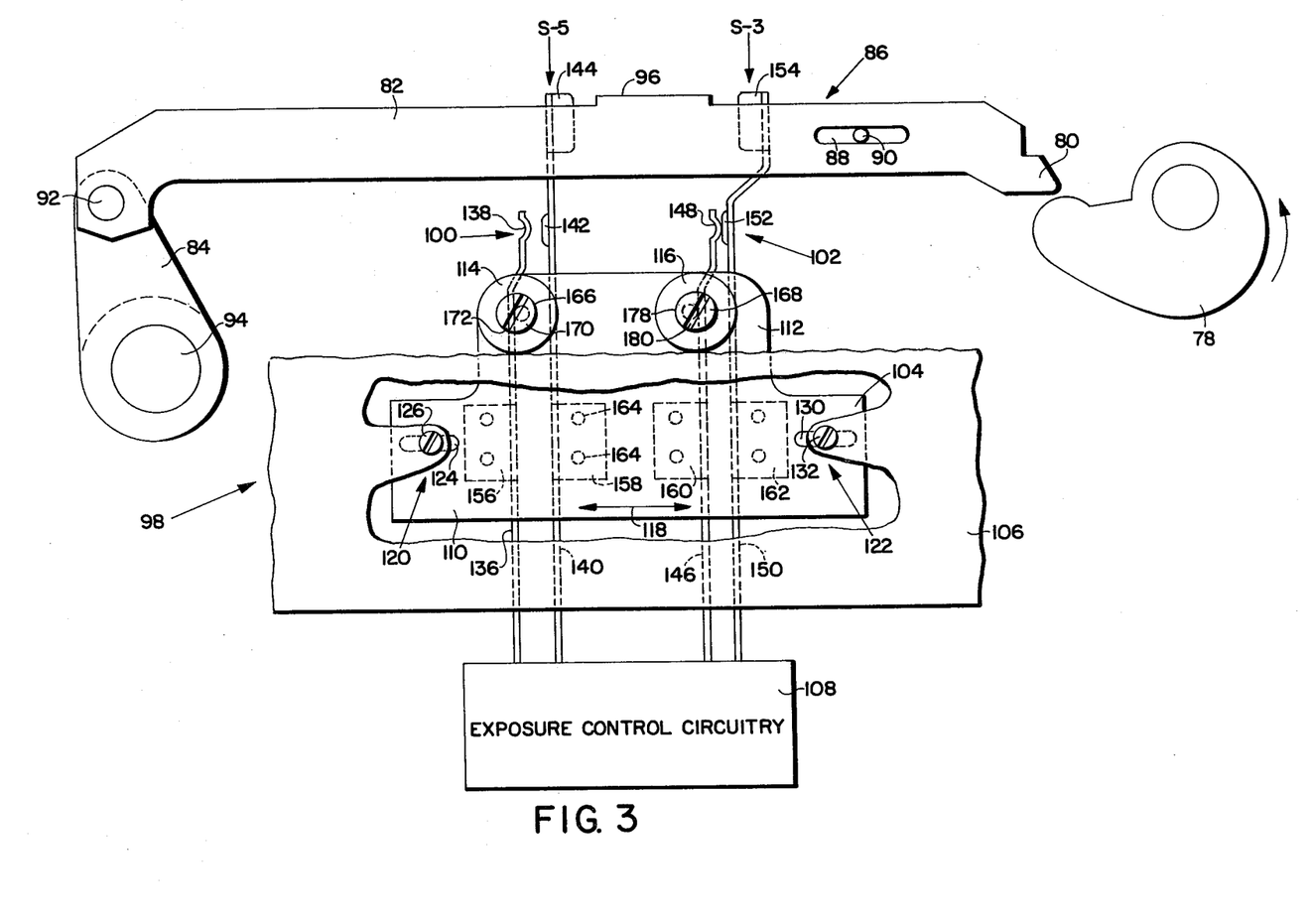
FIG. 3 is a view similar to FIG. 2 showing the switching arrangement in another operational mode.
Figure 4:
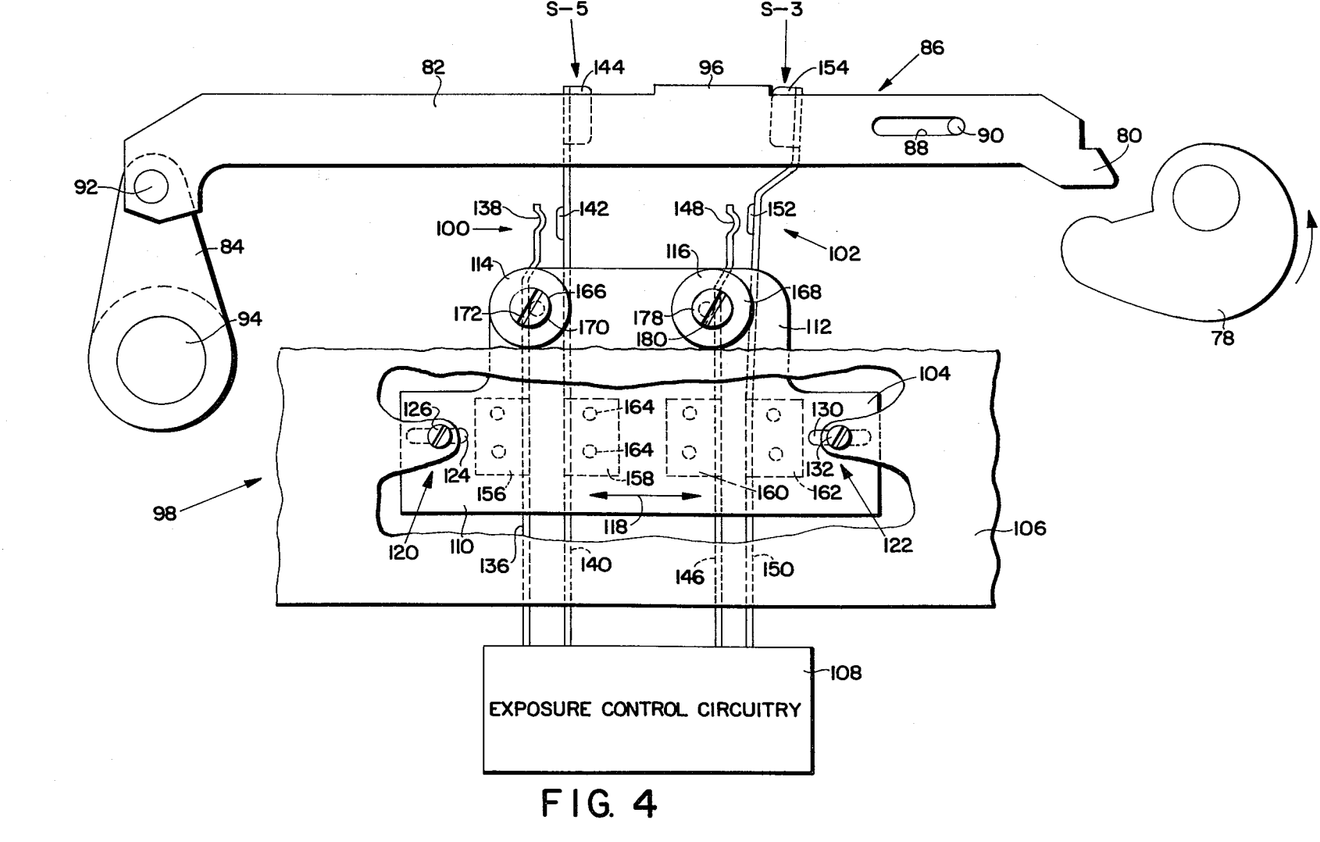
FIG. 4 is a view similar to FIGS. 2 and 3 showing the switching arrangement in still another operational mode.

Inasmuch as the operation of the eccentric drive arrangement 170 and 178 are functionally similar, only one of the drive arrangements will be explained relative to FIGS. 2–5. Switches S5 and S3 perform independent functions within the exposure control circuitry denoted by box 108. Although the functions of S5 and S3 are independent of each other, they are interrelated inasmuch as there is a precise chronological timing between the actuation of S5 and the subsequent actuation of S3. The S5 switch is configured such that the second contact element 140 is spring biased away from the first contact element 136 whereby electrical contact is not made between electrical contact point 138 of contact element 136 and the electrical contact point 142 of second contact element 140 in the absence of actuator member 96. It should be noted in this regard that when actuator member 96 is in its first position as shown in FIG. 2, prior to camera actuation, the member 96 is in engagement with the non-conductive electrical pad 144 so as to bias contact element 140 toward contact element 136 such that electrical contact is struck between contact points 138 and 142. Additionally, the contact 136 is biased to the right (as seen in FIGS. 2–4) and is in abutting arrangement with the off center extension 176 of the eccentric drive arrangement 170.

The two contact elements 146 and 150 of switch S3 are configured such that element 150 is spring biased toward contact element 146, the latter being biased into contact with the off center extension 184 of the eccentric drive arrangement 178. Accordingly, in the absence of actuator member 96 (as shown in FIGS. 2 and 3) switch S3 is in a condition in which electrical contact is realized between electrical contact point 148 of contact element 146 and electrical contact point 152 of contact element 150. It should be noted, however, that the presence of actuator member 96 in its second position (as shown in FIG. 4) provides an engagement between member 96 and electrically non-conductive pad 154 such that the contact point 152 and its associated contact element 150 are moved against the spring biasing of the associated contact element into a position in which electrical contact is broken between contact points 148 and 152. As suggested previously, there exists a strict chronological order of actuation or deactuation between switch S5 and switch S3. Specifically, both ram 82 and actuator member 96 are movable from their first positions as shown in FIG. 2 to their second positions (as shown in FIG. 4) in response to the release of ram 82 from its engagement with cam 78 subsequent to the start of a photographic cycle. When actuator member 96 is in its first position (See FIG. 2), the switch S5 is closed and, due to the above-noted biasing of contact element 150, switch S3 is closed. Thereafter, the actuator member 96 is moved into engagement with pad 154 of contact element 150 to open switch S3 (See FIG. 4), switch S5 having been opened due to the movement of actuator member 96 out of its first position in which it holds switch S5 closed. The time period between the opening of S5 and the subsequent opening of S3 must lie within a very specific time range. Due to the fact that the rate of movement of ram 82 and its associated actuator member 96 are precisely controlled, the only variance is the distance of travel of actuator 96 between the two switches S5 and S3. Accordingly, the placement of switch S5 relative to actuator member 96 in its first position must be precise, as well as the placement of switch S3 relative to the actuator member 96 in its second position. In order to provide for the precise positioning of switches S5 and S3 relative to the first and second positions of actuator member 96, the switching arrangement 98 is provided with the above-noted adjustments. Specifically, the switching arrangement 98 may be longitudinally moved, to the left or to the right as shown in FIGS. 2–4, in order to position either switch S5 or switch S3 relative to the actuator member 96 at its first position or its second position, respectively. For example, the switch S5 may be precisely lined up with the first position of actuator member 96 by the longitudinal movement of the whole switching assembly 98 such that contact is made between contact points 138 and 142 at exactly that first position of the actuator member. The pins 126 and 132 would then be tightened as is exemplified by the screw driver slots formed in the outward portions of the above-noted pins so as to stabilize the switching assembly 98 at a given position.

The correct positioning of switch S5 relative to the first position of actuator member 96 does not of necessity suggest that switch S3 is correctly positioned with respect to the second position of actuator member 96. Accordingly, an independent method of adjustment must be provided for switch S3 when S5 is adjusted relative to the actuating member 96 by longitudinal movement of the switching assembly 98 as a whole. For this reason, the eccentric drive arrangements 170 and 178 are provided. The contact element 146 may be adjusted to the left or to the right by rotation of the eccentric drive arrangement 178 through the slot 180 thereby eccentrically turning the off center extension 184 of the arrangement 178. Due to the fact that contact element 150 is biased toward element 146, the switch S3 and the precise point of contact may be specifically located relative to the second position of actuator member 96. It is in this second position that the actuator member must engage pad 154 of contact element 150 such that electrical contact is broken between contact point 148 and 152 of switch S3. This point at which S3 is broken may be now precisely determined by the independent adjustment of switch S3 without further movement of switch S5 relative to the actuator member 96 at its first position. Should the switch S3 be first adjusted relative to the second position of the actuator member 96 by the longitudinal movement of the switching arrangement 98 through its slot and pin arrangements 120 and 122, then the switch S5 would be independently adjusted relative to the first position of actuator member 96 by adjustment of the eccentric drive arrangement 172 associated with switch S5. The point of contact of contact points 138 and 142 may be precisely located due to the adjustment of the above-noted range without any realignment of the contact position of switch S3. Accordingly, a switching arrangement having at least two adjustments is provided in connection with a plurality of independent switches which have a common actuator and which must be actuated or deactuated in a very specific timed relationship with respect to the actuator. The switching arrangement of the present invention provides for such an adjustment.

Figure 6:
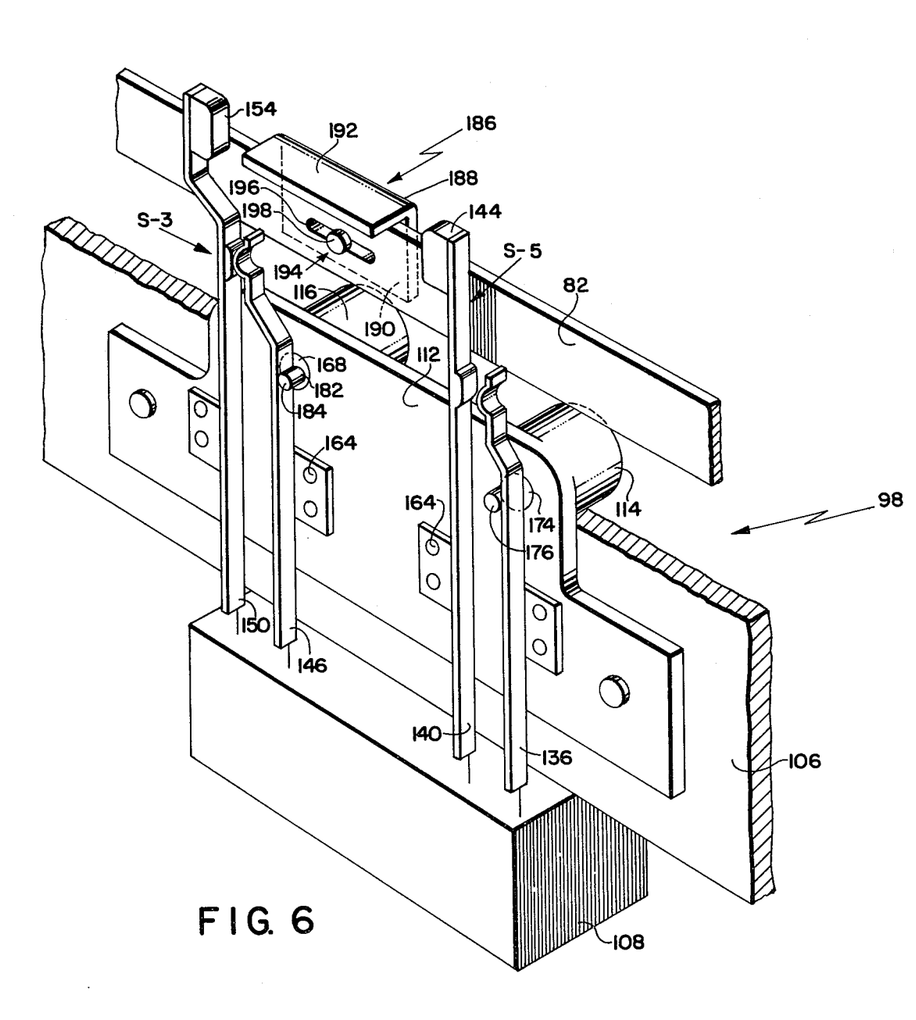
FIG. 6 is a perspective view of a second embodiment of the present invention.

Looking to FIG. 6, there is shown a second embodiment of the present invention wherein the actuator member is adjustable and no longitudinal movement of the switching assembly 98 is provided. Specifically, an actuator member shown generally at 186 includes a generally L-shaped member 188 having a vertical portion 190 and an inwardly extending horizontal portion 192. The actuator member 186 includes a pin and slot arrangement 194 configured having a slot 196 and a pin 198. The actuator member 186 is movable longitudinally relative to the ram 82 through the pin and slot arrangement 194 so as to adjust the actuator member relative to either its correct first position or its correct second position such that correct contact is made at switch S5 or switch S3, respectively. When properly adjusted for either its first position or its second position, the actuator member 186 is secured to ram 82 at that position by any appropriate means (not shown) located on the outward side of ram 82 in alignment with pin 198. When the actuator member 186 has been aligned relative to either its first position or its second position, i.e., relative to switch S5 or switch S3, respectively, then the remaining switch must be independently adjusted relative to the remaining position of actuator member 186 through its eccentric drive arrangement associated therewith. Accordingly, both the switch S5 and the switch S3 and the actuator member 186 may be adjusted relative to each other through the use of the eccentric drive arrangement associated with each switch and the longitudinal adjustment provided relative to the actuator member 186.

The efficacy of providing for a switching arrangement according to the present invention may be best understood when it is realized that the cost reduction and ease of manufacture are respectively decreased and increased. Additionally, the precise nature of the breaking of switches S5 and S3 in timed relationship to one another should be tested during manufacture in a dynamic state such that all the gears and components of camera 10 are moving and a precise location of both switch S5 and S3 relative to the two positions of the actuator member may be made. The adjustment of switches S5 and S3 from the lateral side conveniently provides for such precision positioning during such a dynamic state.

Thus configured, the switching arrangement of the present invention provides for a dual electrical switching arrangement which is mechanically opened and closed in specific timed relationship to an actuator member. Independent adjustments are provided for each of the dual switches relative to the actuator member such that a precise location of each of the dual switches relative to specific locations of the actuator member may be made.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. A photographic camera comprising:
   a housing;
   exposure control circuitry for performing a variety of operational programs for defining a photographic cycle including the exposure of photosensitive material;
   means for initiating a photographic cycle; and
   a switching arrangement connected to select portions of said exposure control circuitry for precisely sequentially influencing a plurality of operational programs subsequent to the start of the photographic cycle, said switching arrangement comprising:
   a first pair of electrical contacts;
   a second pair of electrical contacts;
   means for electrically isolating and supporting said first pair and said second pair of electrical contacts from each other, said isolating and supporting means including means for spacially separating said first and said second pair of electrical contacts from each other a given distance;
   actuator means movable between a first position, in which it engages one contact of said first pair of electrical contacts, and a second position, in which it engages one contact of said second pair of electrical contacts;
   first adjusting means for adjusting movement of said isolating and supporting means as well as said first and second pair of electrical contacts for predeterminely locating either said first pair of electrical contacts relative to said actuator means at its first position or said second pair of electrical contacts relative to said actuator means at its said second position; and
   second adjusting means, associated with said first pair of electrical contacts or said second pair of electrical contacts for adjusting said first pair of contacts relative to said actuator means when said actuator means is in said second position or said second pair of contacts relative to said actuator means when said actuator means is in said first position whereby said actuator means operates said first and second pair of contacts in a predetermined sequence as said actuator means moves from said first position to said second position.

2. The photographic camera of claim 1 in which said second adjusting means includes means for providing for reorientation of the pair of contacts with which it is associated in a direction parallel to the direction of movement of said actuator means between its said first position and its said second position for adjusting the pair of contacts with which it is associated relative to said actuator means when the other pair of contacts is adjusted due to said first adjusting means.

3. The photographic camera of claim 1 in which said actuator means is configured to establish electrical engagement between said first pair of electrical contacts when it is in its said first position and is further configured to break electrical engagement between said second pair of electrical contacts when it is in its said second position, said first pair of electrical contacts including means for biasing one of said contacts out of engagement with the other contact of said first pair of contacts and said second pair of electrical contacts including means for biasing one of said contacts into engagement with the other contact of said second pair of contacts, said first adjusting means providing for an adjustment of one pair of electrical contacts relative to said actuator means at one of its positions, said second adjusting means including means for reorienting at least a portion of the pair of electrical contacts with which it is associated in a direction parallel to the direction of movement of said actuator means independently of said one pair of contacts, whereby both said first pair and said second pair of electrical contacts are independently adjustable with respect to said actuator means at its said first position and its said second position, respectively.

4. The photographic camera of claim 3 in which said actuator means is movable from its said first position to its said second position within a given time interval, said actuator means including means operative to first open the electrical engagement between said first pair of electrical contacts and then at a predetermined time period thereafter open the electrical engagement between said second pair of electrical contacts, said reorienting means being configured to provide for the adjustment of the pair of contacts with which it is associated such that the opening of said first pair of contacts and the opening of said second pair of contacts are adjusted relative to said given time interval of said actuator means.

5. The photographic camera of claim 1 in which said first and said second pairs of contacts have contact points where said contacts of each pair make engagement with each other relative to said isolating and supporting means, said second adjusting means including an eccentric drive adjusting member positioned in an engageable position with respect to the pair of contacts with which it is associated for adjusting the point of engagement between the pair of contacts relative to said isolating and supporting means.

6. The photographic camera of claim 5 in which said switching arrangement further includes means for positioning said eccentric drive adjusting member between the pair of contacts of said first pair of contacts.

7. The photographic camera of claim 1 in which said isolating and supporting means is configured as a block of non-conductive material for supporting and electrically isolating said first pair of electrical contacts from said second pair of electrical contacts by said given distance, said second adjusting means including means for reorienting at least a portion of the contacts with which it is associated relative to said isolating and supporting means.

8. In a photographic camera capable of performing a photographic cycle comprising a plurality of functions occurring in a predetermined sequence, the improvement comprising:
an actuator;
actuable means for displacing said actuator along a predetermined path between first and second positions in a preselected time interval;
a fixedly positioned frame member;
a support;
adjustable means for mounting said support to said frame member so that the position of said support relative to said first and second positions of said actuator may be selectively varied;
a first pair of elongated contact elements, respectively provided with aligned electrical contact points, one end of each said contact element being fixedly connected to said support and the other end of one of said contact elements extending beyond the other end of the other said contact element into said predetermined displacement path of said actuator to be engageable by said actuator as it travels between its said first and second positions;
means responsive to said aligned electrical contact points of said first pair of contact elements being brought into engagement or being disengaged from one another for performing a first of the camera functions;
a second pair of elongated contact elements, respectively provided with aligned electrical contact points, one end of each said contact element of said second pair of contact elements being fixedly connected to said support and the other end of one said contact element of said second pair of contact elements extending beyond the other end of the other said contact element of said second pair of contact elements into said predetermined displacement path of said actuator in spaced relationship to said other end of said other contact element of said first pair of contact elements to be engageable by said acutator as it travels between its said first and second positions;
means responsive to said aligned electrical contact points of said second pair of contact elements being brought into engagement or being disengaged from one another for performing a second of the camera functions; and
manually actuable means for acting against one of said elongated contact elements of said first pair of contact elements to adjust its initial position relative to said support and thereby adjust the position along said predetermined path at which said actuator is effective to cause said electrical contact point of said adjustable contact element to be engaged with or to be disengaged from said electrical contact point aligned therewith, an operator thus being able to vary the effective positions of said electrical contact points of both said first and second pairs of contact elements relative to said first and second positions of said actuator in unison by manipulating said adjustable means for mounting said support to said frame member, and being able to vary the effective position, relative to said first and second positions of said actuator, of said electrical contact points of said first pair of contact elements without changing the effective position, relative to said first and second positions of said actuator, of said electrical contact points of said second pair of contact elements by manipulating said manually actuable means for acting against at least one of said elongated contact elements.

9. A photographic camera comprising:
a housing;

exposure control circuitry for performing a variety of operational programs for defining a photographic cycle including the exposure of photosensitve material;

means for initiating a photographic cycle; and a switching arrangement connected to select portions of said exposure control circuitry for precisely sequentially influencing a plurality of operational programs subsequent to the start of the photographic cycle, said switching arrangement comprising:

a first pair of electrical contacts;

a second pair of electrical contacts;

means for electrically isolating and supporting said first pair and said second pair of electrical contacts from each other, said isolating and supporting means including means for spacially separating said first and said second pair of electrical contacts from each other a given distance;

actuator means movable between a first position, in which it engages one contact of said first pair of electrical contacts, and a second position, in which it engages one contact of said second pair of electrical contacts;

first adjusting means operative to provide for simultaneous movement of both said first pair and said second pair of electrical contacts along with said isolating and supporting means to predeterminely locate either said first pair of electrical contacts relative to said actuator means at said first position or said second pair of electrical contacts relating to said actuator means at said second position, the adjusting of either said first pair of electrical contacts relative to said actuator means at its first position or said second pair of electrical contacts relative to said actuator means at its second position resulting in movement of the pair of contacts adjusted as well as the remaining pair of electrical contacts; and second adjusting means, associated with said first pair of electrical contacts or said second pair of electrical contacts for adjusting said first pair of contacts relative to said actuator means when said actuator means is in said second position or said second pair of contacts relative to said actuator means when said actuator means is in said first position whereby said actuator means operates said first and second pair of contacts in a predetermined sequence as said actuator means moves from said first position to said second position, said second adjusting means providing for the independent reorientation of the remaining pair of electrical contacts without a similar adjustment to the pair of contacts adjusted by said first adjusting means such that both pairs of electrical contacts may be adjusted relative to said first and second positions of said actuator means independently of each other.

10. A photographic camera comprising:

a housing;

exposure control circuitry for performing a variety of operational programs for defining a photographic cycle including the exposure of photosensitive material;

means for initiating a photographic cycle; and a switching arrangement connected to select portions of said exposure control circuitry for precisely sequentially influencing a plurality of operational programs subsequent to the start of the photographic cycle, said switching arrangement comprising:

a first pair of electrical contacts;

a second pair of electrical contacts;

means for electrically isolating and supporting said first pair and said second pair of electrical contacts from each other, said isolating and supporting means including means for spacially separating said first and said second pair of electrical contacts from each other a given distance;

actuator means movable a distance substantially equal to said given distance between a first position, in which it engages one contact of said first pair of electrical contacts, and a second position, in which it engages one contact of said second pair of electrical contacts;

first adjusting means for adjusting movement of said isolating and supporting means as well as said first and second pair of electrical contacts for predeterminely locating either said first pair of electrical contacts relative to said actuator means at its first position or said second pair of electrical contacts relative to said actuator means at its said second position; and second adjusting means, associated with said first pair of electrical contacts or said second pair of electrical contacts for adjusting said first pair of contacts relative to said actuator means when said actuator mean is in said second position or said second pair of contacts relative to said actuator means when said actuator means is in said first position whereby said actuator means operates said first and second pair of contacts in a predetermined sequence as said actuator means moves from said first position to said second position, said second adjusting means including contact reorienting means for providing a supplementary adjustment to the pair of contacts with which it is associated in a direction parallel to the direction of movement of said actuator means for selectively increasing or decreasing said given distance between said first and second pair of electrical contacts.

11. A photographic camera comprising:

a housing;

exposure control circuitry for performing a variety of operational programs for defining a photographic cycle including the exposure of photosensitive material;

means for initiating a photographic cycle; and a switching arrangement connected to select portions of said exposure control circuitry for precisely sequentially influencing a plurality of operational programs subsequent to the start of the photographic cycle, said switching arrangement comprising:

a first pair of electrical contacts including means for biasing said contacts out of engagement with each other;

a second pair of electrical contacts including means for biasing said contacts into engagement with each other;

means formed of an electrically non-conductive material for electrically isolating and supporting said first pair and said second pair of electrical contacts from each other, said isolating and supporting means including means for spacially separating said first and said second pair of electrical contacts from each other a given distance;

actuator means movable a distance substantially equal to said given distance between a first position, in which it establishes electrical engagement between said first pair of electrical contacts, and a second position, in which it breaks electrical engagement between said second pair of electrical contacts;

first adjusting means for adjusting movement of said isolating and supporting means as well as said first and second pair of electrical contacts for predeterminely locating either said first pair of electrical contacts relative to said actuator means at either its first or second positions or said second pair of electrical contacts relative to said acutator means at its said second position; and second adjusting means, associated with said first pair of electrical contacts or said second pair of electrical contacts for adjusting said first pair of contacts relative to said actuator means when said actuator means is in said second position or said second pair of contacts relative to said actuator means when said actuator means is in said first position whereby said actuator means operates said first and second pair of contacts in a predetermined sequence as said actuator means moves from said first position to said second position, said second adjusting means including an eccentric drive adjusting member positioned in an engageable position with respect to the pair of contacts with which it is associated, said second adjusting means being actuatable to reorientate at least a portion of the pair of contacts with which it is associated in a direction parallel to the direction of movement of said actuator means independent of the adjustment of the one pair of electrical contacts relative to said actuator means due to said first adjusting means, whereby both said first pair of electrical contacts and said second pair of electrical contacts are independently adjustable with respect to said actuator means at its said first position and at its said second position, respectively.

* * * * *